UNITED STATES PATENT OFFICE.

EDWARD GOODRICH ACHESON, OF NIAGARA FALLS, NEW YORK.

METHOD OF DEFLOCCULATION AND PRODUCT THEREOF.

986,793.  Specification of Letters Patent.  Patented Mar. 14, 1911.

No Drawing.  Application filed January 29, 1909.  Serial No. 474,967.

*To all whom it may concern:*

Be it known that I, EDWARD GOODRICH ACHESON, a citizen of the United States, residing at Niagara Falls, in the county of Niagara and State of New York, have invented certain new and useful Improvements in Methods of Deflocculation and Products Thereof, of which the following is a specification.

In my prior application Ser. No. 399,486, filed October 28, 1907, I have described and claimed a substantially water-free mixture consisting essentially of a deflocculated amorphous body, as graphite, and a non-aqueous medium, as oil. According to the method of said application the amorphous body was deflocculated in presence of water, and the water thereafter replaced by a non-aqueous medium. I have now discovered that certain liquids or media which are miscible with water and are solvents for materials having a deflocculating or flocculation-preventing action, may be employed instead of water in effecting the deflocculation of graphite, lamp-black, or other amorphous bodies. As examples of such liquids I may mention alcohol and glycerin. These liquids, even when strictly anhydrous, are capable of dissolving certain deflocculating or flocculation-preventing agents, and when such solution occurs the deflocculation may readily be secured by the same methods employed for deflocculating in presence of water, as for instance by macerating or working the graphite or other anhydrous body, to which a proper proportion of a deflocculating material soluble in the medium employed has been added, in presence of a sufficient quantity of this medium to produce a paste. The resulting paste may thereafter be thinned by the addition of further quantities of this medium, or of another medium miscible with water, or of water; or if desired the graphite may be transferred to a liquid immiscible with water, as for example a mineral or vegetable oil. In case the liquids employed for deflocculation contain water, as for example commercial alcohol or glycerin, the deflocculating effect is likewise secured.

For convenience, I will hereafter refer to such liquids as are herein described for effecting deflocculation as liquids miscible with water, by which expression I intend to include the anhydrous liquids, such as alcohol or glycerin, as well as the liquids containing a greater or less proportion of water.

As specific examples of the process, I have found that graphite may readily be deflocculated by means of cutch in presence of alcohol, whether anhydrous or dilute; and that a great variety of bodies or compounds derived from vegetable matter, or extracts thereof, as for example dextrin, cutch, tannic acid, Irish moss, peach or cherry gum, or the like, are effective when used in connection with glycerin, anhydrous or dilute. These various materials are likewise effective in connection with absolute or dilute alcohol in so far as they are soluble therein. By this means I am enabled to prepare directly a paste or suspension containing deflocculated graphite or other amorphous body, said paste or suspension being either free from water or containing such proportion of water as may be desired. For example I am able to prepare a suspension consisting essentially of deflocculated graphite and glycerin, in which the particles of graphite do not adhere to each other, but remain in suspension. By adding to this mixture a proper proportion of water, or by conducting the operation in presence of a proper proportion of water, I am enabled to produce a mixture or suspension which is directly available for lubricating purposes and which is not subject in use to rapid or undue evaporation.

I claim:

1. The method of deflocculating insoluble bodies which consists in treating the same with a deflocculating agent in presence of a non-aqueous liquid miscible with water.

2. The method of deflocculating insoluble bodies which consists in treating the same with a deflocculating agent in presence of water and a non-aqueous liquid miscible therewith.

3. The method of deflocculating insoluble bodies which consists in treating the same with a deflocculating agent in presence of glycerin.

4. As a new article of manufacture, a mixture consisting essentially of a non-aqueous liquid miscible with water and a deflocculated insoluble body.

5. As a new article of manufacture, a mixture consisting essentially of glycerin and deflocculated graphite.

In testimony whereof, I affix my signature in presence of two witnesses.

EDWARD GOODRICH ACHESON.

Witnesses:
 ORRIN E. DUNLOP,
 W. H. ARISON.